US006325986B1

(12) United States Patent
Marzari et al.

(10) Patent No.: US 6,325,986 B1
(45) Date of Patent: *Dec. 4, 2001

(54) METHOD FOR REDUCING HYDROGEN CHLORIDE EMISSIONS FROM AIR-BLOWN ASPHALT

(75) Inventors: Jorge A. Marzari, Bolingbrook; Katherine E. Poterek, Arlington Heights; Timothy T. Picman, Bridgeview, all of IL (US)

(73) Assignee: Owens Corning Fiberglas Technology, Inc., Summit, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/667,057

(22) Filed: Sep. 21, 2000

Related U.S. Application Data

(63) Continuation-in-part of application No. 09/223,703, filed on Dec. 30, 1998.

(51) Int. Cl.$^7$ ................................. C01B 7/00; C10C 1/20
(52) U.S. Cl. ................... 423/240 R; 95/273; 706/273.1; 208/4; 208/5; 208/6; 208/22; 208/44; 423/240; 423/5
(58) Field of Search .......................... 95/273; 106/273.1; 208/4, 5, 6, 22, 44; 423/240 R, 240 S

(56) References Cited

U.S. PATENT DOCUMENTS

| | | |
|---|---|---|
| 1,997,569 | 4/1935 | Craig et al. . |
| 2,112,250 | 3/1938 | Penniman . |
| 2,179,208 | 11/1939 | Burk et al. . |
| 2,313,596 | 3/1943 | Sorem et al. . |
| 2,506,283 | 5/1950 | Smith et al. . |
| 2,627,498 | 2/1953 | Fink et al. . |
| 3,440,073 | 4/1969 | Fowler et al. . |
| 4,741,868 | 5/1988 | Rooney et al. . |
| 4,915,714 | 4/1990 | Teague et al. . |
| 5,045,094 | 9/1991 | Paranjpe . |
| 5,601,702 | 2/1997 | Yan . |
| 5,611,910 | 3/1997 | Marzari et al. . |
| 6,162,410 | * 12/2000 | Marzari et al. ................. 423/240 R |

FOREIGN PATENT DOCUMENTS

WO 97/29168   8/1997   (WO) .

OTHER PUBLICATIONS

Article entitled "Pick the Best Acid–Gas Emission Controls for Your Plant", Chemical Engineering Progress, Oct. 1998.
Article entitled "Antibiotics to Batteries", Encyclopedia of Chemical Technology, Fourth Edition vol. 3, dated 1992.

* cited by examiner

Primary Examiner—Steven P. Griffin
Assistant Examiner—Maribel Medina
(74) Attorney, Agent, or Firm—Inger H. Eckert, James D. Dottavio

(57) ABSTRACT

In a method for reducing hydrogen chloride emissions from an asphalt air-blowing process, an asphalt is subjected to an air-blowing process where air is bubbled through hot asphalt to raise the softening point of the asphalt. The fumes from the air-blowing process are bubbled through a liquid seal in a knockout tank before going to an incinerator and finally being emitted to the atmosphere. The knockout tank normally operates to condense oil in the fume stream, and the liquid seal is composed of this oil, as well as some of the water evolved in the air-blowing process. When using ferric chloride or ferrous chloride as a catalyst in the air-blowing process, the fume stream contains significant levels of hydrogen chloride. In this invention, a chemical modifier is added to the process oil and water seal in the knockout tank prior to the start of the process in order to reduce the amount of hydrogen chloride in the emitted fume stream by at least 25% by weight compared to the same process without the addition of the chemical modifier.

42 Claims, No Drawings

METHOD FOR REDUCING HYDROGEN CHLORIDE EMISSIONS FROM AIR-BLOWN ASPHALT

RELATED APPLICATION

This application is a Continuation-In-Part of U.S. patent application Ser. No. 09/223,703, filed Dec. 30, 1998.

TECHNICAL FIELD AND INDUSTRIAL APPLICABILITY OF THE INVENTION

This invention relates in general to processing asphalt, and particularly to a method for reducing hydrogen chloride emissions from an asphalt air-blowing process. More particularly, this invention relates to a method for reducing hydrogen chloride emissions from air-blowing an asphalt modified with ferric chloride or ferrous chloride, by adding a chemical modifier to the liquid seal of a knockout tank used in the process. The method has industrial applicability, e.g., in air-blowing asphalt for use as a roofing asphalt.

BACKGROUND OF THE INVENTION

Although most asphalts are used for paving, some asphalts are used for other applications such as roofing. Not all available asphalts are naturally suitable for roofing applications. Asphalts for roofing are air-blown to raise the softening point of the asphalt and to meet other specifications. One way to utilize more asphalt feedstocks for roofing is to add a ferric chloride or ferrous chloride catalyst to the asphalt before the air-blowing process. The ferric chloride or ferrous chloride improves asphalt properties such as penetration at a targeted softening point and accelerates the air-blowing process to reduce processing time.

Unfortunately, hydrogen chloride emissions are generated when an asphalt modified with ferric chloride or ferrous chloride is air-blown. When the asphalt is modified with ferric chloride, the reduction of ferric chloride to ferrous chloride during the air-blowing process generates hydrogen chloride emissions. When ferric chloride is added as an aqueous solution to the asphalt, hydrogen chloride emissions are also generated from free hydrochloric acid present in the aqueous solution. More emphasis is being put on regulating the levels of hydrogen chloride emissions to reduce air pollution, and this trend will increase with time. If the regulated emission levels are not achieved, the asphalt production with ferric chloride or ferrous chloride will be restricted. Current methods for reducing hydrogen chloride emissions from an asphalt air-blowing process do not exist.

The patent literature does not suggest a suitable solution to the problem of hydrogen chloride emissions. U.S. Pat. No. 2,506,283 to Smith et al. discloses the use of ferric chloride as a catalyst during an asphalt air-blowing process, and the addition of calcium oxide or calcium hydroxide to the air-blown asphalt in a separate mixing operation after the air-blowing process is completed.

The purpose of the Smith et al. patent is to prevent the formation of scum on the surface of the asphalt, not to reduce hydrogen chloride emissions. There is no suggestion to add a chemical modifier to the knockout tank after the air-blowing but before the fume stream from the air-blowing process is emitted to the atmosphere.

U.S. Pat. No. 5,611,910 to Marzari et al. discloses a method for reducing $SO_x$ emissions from an asphalt air-blowing process by adding an emission reducing additive to the asphalt prior to air-blowing or early in the process. The additive comprises: (a) at least one compound selected from metal hydroxides, metal oxides, metal carbonates and metal bicarbonates, where the metal is selected from calcium, sodium, potassium and magnesium; and (b) at least one compound selected from metal hydroxides, metal oxides, metal carbonates and metal bicarbonates, where the metal is selected from zinc, copper and aluminum.

The Marzari et al. patent does not disclose the use of ferric chloride or ferrous chloride, or the resulting problem of hydrogen chloride emissions. There is no discussion of a method for reducing hydrogen chloride emissions, and in particular, there is no suggestion to add a chemical modifier to the liquid seal of a knockout tank to reduce hydrogen chloride emissions. Accordingly, it would be desirable to provide a method for reducing hydrogen chloride emissions from air-blowing an asphalt modified with ferric chloride.

SUMMARY OF THE INVENTION

The present invention relates to a method for reducing hydrogen chloride emissions from an asphalt air-blowing process. In the method, an asphalt is subjected to an air-blowing process where air is bubbled through hot asphalt to raise the softening point of the asphalt. The fumes from the air-blowing process are bubbled through a liquid seal in a knockout tank before going to an incinerator and finally being emitted to the atmosphere. The knockout tank normally operates to condense oil in the fume stream, and the liquid seal is composed of this oil, as well as some of the water evolved in the air-blowing process. When using ferric chloride or ferrous chloride as a catalyst in the air-blowing process, the fume stream contains significant levels of hydrogen chloride. In this invention, a chemical modifier is added to the process oil and water seal in the knockout tank prior to the start of the process in order to reduce the amount of hydrogen chloride in the emitted fume stream by at least 25% by weight compared to the same process without the addition of the chemical modifier. The method has the advantage that it does not significantly affect the benefits from the addition of the ferric chloride or ferrous chloride.

Various objects and advantages of this invention will become apparent to those skilled in the art from the following detailed description of the preferred embodiments.

DETAILED DESCRIPTION AND PREFERRED EMBODIMENTS OF THE INVENTION

This invention relates to a method for reducing hydrogen chloride emissions from air-blowing an asphalt modified with ferric chloride and/or ferrous chloride, by adding a chemical modifier to the process oil and water seal in the knockout tank prior to the start of the process.

The asphalt raw material to be air-blown can be either a naturally occurring asphalt or a manufactured asphalt produced by refining petroleum. It can include straight-run fractional-derived asphalts, cracked asphalts, asphalts derived from processing such as asphalt oxidizing, propane deasphalting, steam distilling, chemically modifying, and the like. The asphalt can be either modified or unmodified. Blends of different kinds of asphalt can also be air-blown.

The asphalt raw material is loaded into an apparatus suitable for air-blowing the asphalt, such as a converter. The asphalt is usually loaded at a temperature ranging from about 175° C. to about 230° C. The air-blowing process involves passing air or another oxygen-containing gas through the asphalt in the converter. A mixture of an oxygen-containing gas with an inert gas such as nitrogen or helium can also be used.

The reaction produced by the air-blowing is exothermic and raises the temperature of the asphalt. The temperature of the asphalt during the air-blowing process usually ranges from about 200° C. to about 270° C. The maximum temperature is usually controlled by a water-cooled jacket or other means.

The air-blowing process increases the usefulness of the asphalt by raising the softening point from a typical starting point below about 40° C. to a final softening point of at least about 80° C. The processing time can take from about 1 hour to about 18 hours to reach the desired softening point. The processing time is dependent on the process temperature, the air flow rate, the characteristics of the asphalt, and the specifications of the desired product.

As discussed above, ferric chloride and/or ferrous chloride can be added by blending it into the asphalt prior to the air-blowing process, or by adding it to the asphalt in the converter early in the process, usually within about the first hour. The addition of ferric chloride and/or ferrous chloride increases the rate of the air-blowing process compared to the same process without the addition of ferric chloride and/or ferrous chloride. The ferric chloride usually increases the rate by at least about 20%, while the ferrous chloride usually increases the rate by at least about 35%. The addition of ferric chloride and/or ferrous chloride also usually has other beneficial effects, such as increased final penetration of the air-blown asphalt at a target softening point. Both the ferric chloride and ferrous chloride usually increase the final penetration of the asphalt by at least about 15%, and typically by at least about 20% to 30%.

The air flow blown through the converter usually ranges from about 220 to 650 liters (STP) per hour/liter of processed asphalt. The air is bubbled through the hot asphalt, and it produces a fume stream after it passes through the asphalt. The passing air strips some materials from the asphalt, including hydrogen chloride generated from the addition of ferric chloride and/or ferrous chloride.

The fume stream from the air-blowing process exits the converter and passes through a fume line to a knockout tank. The fume stream is bubbled through a liquid seal in the knockout tank. The knockout tank normally operates to condense oil in the fume stream, and the liquid seal is composed of a mixture of this oil as well as some of the water evolved in the air-blowing process. The temperature of the oil/water mixture in the knockout tank typically ranges from about 65° C. to about 121° C. The knockout tank condenses some material from the fume stream; however, a significant amount of material still passes through. Prior to release into the atmosphere, the fume stream is subjected to an incineration process to control the emission of volatile organic compounds. Unfortunately, neither the knockout tank nor the incineration process adequately controls the emission of hydrogen chloride.

In accordance with the present invention, a chemical modifier is added to the liquid seal in the knockout tank to reduce the hydrogen chloride emissions. As described below, the chemical modifier is a chemical or a combination of chemicals that is effective for reducing the hydrogen chloride emissions. The addition of the chemical modifier reduces the hydrogen chloride emissions from the air-blowing process, preferably by at least about 25% (by weight percent), preferably by at least about 45%, and more preferably by at least about 65%, compared to the same process without the addition of the chemical modifier. The hydrogen chloride emissions are measured at the outlet of the incinerator stack.

It was not expected beforehand that the addition of a chemical modifier to the liquid seal in the knockout tank would be effective in reducing hydrogen chloride emissions. The chemical modifier has very little effect on sulfur dioxide emissions when added to the liquid seal. While not intending to be limited by theory, it is believed that the high solubility of hydrogen chloride in the water of the liquid seal allows the chemical modifier to more easily react with the hydrogen chloride to reduce emissions.

It has been discovered that certain types of chemicals are suitable for reducing hydrogen chloride emissions when added to the liquid seal in the knockout tank, while others are not. Because of the particular chemistry and process conditions in the knockout tank, it was not apparent beforehand which chemicals could be used successfully. Preferably, the chemical modifier is an oxide or hydroxide of calcium, magnesium, barium, sodium, potassium, iron or aluminum. More preferably, the chemical modifier is selected from calcium oxide (lime), calcium hydroxide (hydrated lime), magnesium oxide, magnesium hydroxide, and combinations thereof. When the chemical modifier is calcium hydroxide, the chemical modifier is preferably added to the liquid seal in the knockout tank at a level within the range of from about 0.01 kg to about 5 kg per every kilogram of active ferric chloride and/or ferrous chloride that is added to the asphalt, preferably 0.01 kg to about 2 kg per every kilogram of active ferric chloride and/or ferrous chloride, and more preferably 0.01 kg to about 0.5 kg per every kilogram of active ferric chloride and/or ferrous chloride that is added to the asphalt . . . The term "active" ferric chloride and/or ferrous chloride means the actual weight of ferric chloride and/or ferrous chloride itself, excluding the weight of solvation and solution water.

The proposed reactions of the preferred chemical modifiers with hydrogen chloride are:

Calcium oxide/hydroxide+HCl→calcium chloride+water

Magnesium oxide/hydroxide+HCl→magnesium chloride+water

These reactions make the preferred chemical modifiers highly suitable to abstract hydrogen chloride in the liquid seal of the knockout tank.

In an alternative embodiment, the amount of chemical modifier is measured with respect to the volume of process oil, or blowing distillate oil (BD oil), within the knockout tank. Preferably at least about 0.001 kg of chemical modifier is added per liter of process oil, or BD oil. Improvement may be achieved using 0.0001 kg/l–0.0005 kg/l of chemical modifier to the process oil, but relatively higher levels of chemical modifier, such as 0.001 kg/l, are more beneficial. A preferred method of adding the modifier comprises adding an excess amount of modifier to the process oil, thereby obtaining the desired concentration as the process oil soaks up the modifier. No adverse effect is expected from increasing the concentration of chemical modifier, and no upper limit is intended to achieve the HCL emission reduction. However, the upper limit is practically limited by the ability of the process oil to absorb the modifier. In one trial, at 0.001 kg/l, we have achieved 10% HCL emissions reduction, and have achieved greater reductions at higher concentrations. In a second example, 0.011 kg/l of dry Calcium Hydroxide to the process oil, 84% reduction in HCL emissions were observed. The modifier, such as Calcium Hydroxide, may be added to the BD oil in solid form, or may be added within a solution, for example 30–50% concentration water solution.

In another embodiment of the invention, the hydrogen chloride emissions are further reduced by the addition of a filter between the knockout tank and the incinerator. The filter removes hydrogen chloride by condensation and coalescing of the cooled fume stream. The fume stream can be cooled either by natural heat exchange from the ductwork to the atmosphere, or by any specific cooling operation. The filter can be any type of filter capable of removing condensable oil or water from the fume stream. If used alone, the filter preferably reduces the hydrogen chloride emissions by at least about 25%, and more preferably by at least about 45%, compared to the same process without the filter. If used in combination with the chemical modifier, the filter preferably reduces the hydrogen chloride emissions by at least about 10% in addition to the reduction provided by the chemical modifier, and more preferably by at least about 20%.

Preferably, the filter is a fiber bed filter. Such filters are described in Kirk-Othmer, Encyclopedia of Chemical Technology, Vol. 1, 4th Ed., pages 799–800 (1991). The fiber bed filter includes a fiber bed element for condensing the fume stream. The fiber bed element is made from fibers that are packed either randomly or in alignment. The use of randomly oriented fiber beds is preferred in the present invention. The randomly oriented fiber beds include those made with mineral fibers such as glass fibers, polymer fibers such as polyester fibers or polypropylene fibers, and fluorocarbon fibers. An example of suitable fibers would be finely spun glass fibers having an average diameter of about 1–2 microns. Other fibers will be acceptable depending on their compatibility with the chemical modifier and with asphalt.

In another preferred embodiment of the invention, the hydrogen chloride emissions are further reduced by the injection of water spray or steam into the fume stream immediately downstream from the converter. It has been found that both water sprays and steam are effective in removing hydrogen chloride from the fume stream because the hydrogen chloride is highly hygroscopic. Preferably, the water spray or steam is injected into the fume line within about 0.3 meter of exiting the converter. Preferably, the water spray or steam is injected into the fume stream at a rate within the range of from about 0.05 to about 6 liters of condensed water per minute per cubic meter of air flow at STP. If used alone, the water spray or steam preferably reduces the hydrogen chloride emissions by at least about 25%, and more preferably by at least about 45%, compared to the same process without the water spray or steam. If used in combination with the chemical modifier, the water spray or steam preferably reduces the hydrogen chloride emissions by at least about 10% in addition to the reduction provided by the chemical modifier, and more preferably by at least about 20%. If the water spray or steam is used in combination with the filter, the hydrogen chloride emissions are preferably reduced by at least about 65% compared to the same process without the filter and water spray or steam.

EXAMPLE 1

Addition of Chemical Modifier to Liquid Seal in Knockout Tank

Liquid Ferric Chloride Addition: Starting with 2724 kilograms of asphalt in a large converter, 2270 kilograms was moved to a surge tank leaving 454 kilograms in the converter. This allowed the asphalt level in the converter to be below the level of the port where the liquid ferric chloride was added. The blower was turned on and down to a differential pressure reading of 1.8. The liquid ferric chloride was then added using a hand rotary pump, so that the total level of active ferric chloride was 0.3% by weight of the asphalt. After the ferric chloride was added, the 2270 kilograms of asphalt in the surge tank was brought back to the converter and the run started.

The addition of powdered calcium hydroxide to the liquid seal in the knockout tank was carried out through a plug spout in the top of the knockout tank. The chemical modification was performed before the converter run was started.

A probe on the incinerator stack pulled samples of the evolving emission gasses at a rate of 6–8 liters per minute. The gas was brought through a heated sample line at 179° C. to a Mini-GASS™ gas analysis sampling system (Perma Pure Inc., Toms River, N.J.). The sampling system removed the water from the gas and sent it to the following analyzers: for hydrogen chloride emissions, a TECO Model 15 analyzer (Thompson Equipment Co., New Orleans, La.); and for sulfur dioxide emissions, a Bovar Model 721 ATM analyzer (Bovar Equipment Co., Hattershein, West Germany). The emissions were measured continuously using these monitors. The analog signal from each monitor was collected by a Campbell CR10 datalogger (Campbell Scientific, Inc., Logan, Utah) and transformed to digital values. After the run, the emissions data were downloaded to a laptop computer using datalogger support software. The emissions were collected every 30 seconds. The equipment was calibrated before every run using both a zero gas and a calibration gas. The results are shown in the following Table 1 (emissions are in units of kilograms per metric ton [1000 kg]):

TABLE 1

| $Ca(OH)_2$ (kg) | Other Modif. | HCl Emissions | | SOx Emissions | | Blow Time hrs. | Penetration 25° C. mm/10 |
|---|---|---|---|---|---|---|---|
| | | kg/ton | % Red. | Kg/ton | % Red. | | |
| — | — | 0.187 | 0 | 0.133 | 0 | 1.90 | 19.6 |
| 0.454 | — | 0.104 | 44 | 0.128 | 4 | 2.09 | 19.8 |
| 0.908 | — | 0.030 | 84 | 0.124 | 7 | 2.09 | 19.6 |
| 1.816 | — | 0.033 | 83 | 0.099 | 26 | 1.79 | 19.3 |
| 0.908 | Fabric Filter | 0.027 | 86 | 0.119 | 10 | 1.72 | 19.8 |
| 0.454 | Chem.* Modif. | 0.059 | 88 | 0.101 | 29 | 1.73 | 19.8 |

*A chemical modifier comprising 0.012% NaOH + 0.15% ZnO, by weight of the asphalt, was added to the asphalt in the converter.

The results show that the addition of calcium hydroxide to a liquid seal in a knockout tank reduces hydrogen chloride emissions from a ferric chloride modified asphalt during the asphalt air-blowing process.

For the above table, the knockout tank contains 22 gallons (83 liters) of BD oil. Therefore, in the above table, when 0.454 kg Ca(OH)2 are added, a concentration of 0.005 kg/l exists in the BD oil. This concentration produced a 44% reduction of HCL emissions. Likewise, when 0.908 kg were added (0.011 kg/l), a reduction of 84% was observed.

EXAMPLE 2

Addition of Fabric Filter Between Knockout Tank and Incinerator

In an asphalt air-blowing process as described above, a fabric filter was installed in the fume line between the knockout tank and the incinerator. The fabric filter was turned on before the run was started and before the blower was turned on. The results are shown in the following Table 2:

TABLE 2

| Fabric Filter | Other Modif. | HCl Emissions kg/ton | HCl Emissions % Red. | SOx Emissions kg/ton | SOx Emissions % Red. | Blow Time hrs. | Penetration 25° C. mm/10 |
|---|---|---|---|---|---|---|---|
| No | — | 0.187 | 0 | 0.133 | 0 | 1.90 | 19.6 |
| Yes | — | 0.027 | 85 | 0.124 | 6 | 2.08 | 20.5 |
| Yes | — | 0.008 | 96 | 0.113 | 15 | 1.92 | 19.6 |
| Yes | Chem.* Modif. | 0.008 | 96 | 0.073 | 45 | 2.23 | 18.3 |
| Yes | Chem.** Modif. | 0.022 | 88 | 0.095 | 29 | 1.73 | 19.8 |

*A chemical modifier comprising 0.012% NaOH and 0.15% ZnO, by weight of the asphalt, was added to the asphalt in the converter.
**A chemical modifier comprising 1.82 kilograms of calcium hydroxide was added to the liquid seal in the knockout tank (0.022 kg/l BD oil).

The results show significant reductions in HCl emissions by the use of the fabric filter alone and in combination with a chemical modifier.

EXAMPLE 3

Injection of Steam Into Fume Line After Converter

In an asphalt air-blowing process as described above, steam or water spray was injected into the fume line after the converter in an attempt to reduce hydrogen chloride emissions from the process. Both applications were attached to the fume line within 0.3 meter of exiting the converter. The results are shown in the following Table 3:

TABLE 3

| Steam | Other Modif. | HCl Emissions kg/ton | HCl Emissions % Red. | SOx Emissions kg/ton | SOx Emissions % Red. | Blow Time hrs. | Penetration 25° C. mm/10 |
|---|---|---|---|---|---|---|---|
| No | — | 0.187 | 0 | 0.133 | 0 | 1.90 | 19.6 |
| Yes* | — | 0.021 | 89 | 0.131 | 2 | 2.10 | 19.0 |
| Yes** | — | 0.022 | 88 | 0.155 | −17 | 1.89 | 19.7 |
| Yes* | Fabric Filter | 0.008 | 96 | 0.113 | 15 | 1.92 | 19.6 |
| No | Water Spray* | 0.085 | 55 | 0.191 | −44 | 1.97 | 19.0 |

*3.785 kg. of condensed water per hour
**9.5 kg. of condensed water per hour

The results show a significant reduction in HCl emissions with steam or water spray. The steam was somewhat more effective, reducing HCl emissions by 88% and 89%. Using steam in combination with a fabric filter produced an even greater HCl emissions reduction of 96%.

The principle and mode of operation of this invention have been described in its preferred embodiments. However, it should be noted that this invention may be practiced otherwise than as specifically illustrated and described without departing from its scope.

What is claimed is:

1. A method for reducing hydrogen chloride emissions from an asphalt blowing process comprising:
   subjecting an asphalt to a blowing process using a catalyst selected from ferric chloride, ferrous chloride, or mixtures thereof, to produce a fume stream containing hydrogen chloride,
   passing the fume stream through a liquid seal, and
   emitting the fume stream,
   wherein a chemical modifier is added to the liquid seal prior to passing the fume stream through the liquid seal, and wherein the addition of the chemical modifier to the liquid seal reduces the amount of hydrogen chloride in the emitted fume stream compared to the same process without the addition of the chemical modifier.

2. The method of claim 1 wherein the chemical modifier is added to the liquid seal at a level within the range of from about 0.01 kg to about 2 kg per every kilogram of active catalyst that is added to the asphalt.

3. The method of claim 2 wherein the chemical modifier is selected from calcium oxide, calcium hydroxide, magnesium oxide, magnesium hydroxide, barium oxide, barium hydroxide, sodium oxide, sodium hydroxide, potassium oxide, potassium hydroxide, iron oxide, iron hydroxide, aluminum oxide, aluminum hydroxide, or combinations thereof.

4. The method of claim 3 wherein the chemical modifier is selected from calcium oxide, calcium hydroxide, magnesium oxide, magnesium hydroxide, or combinations thereof.

5. The method of claim 4 wherein the chemical modifier is calcium hydroxide.

6. The method of claim 1 wherein the chemical modifier is calcium hydroxide, and is added to the liquid seal at a level above about 0.001 kg per every kilogram of active catalyst that is added to the asphalt.

7. The method of claim 6 wherein the calcium hydroxide is added to the liquid seal at a level within the range of about 0.01 kg to about 2 kg per every kilogram of active catalyst that is added to the asphalt.

8. The method of claim 7 wherein the liquid seal is within a knockout tank, and excess calcium hydroxide is added to a process oil within the knockout tank and the calcium hydroxide is absorbed by the process oil.

9. The method of claim 7 wherein the calcium hydroxide is added to the liquid seal in an aqueous solution.

10. The method of claim 7 wherein the addition of the chemical modifier reduces the amount of hydrogen chloride in the emitted fume stream by at least about 25% by weight.

11. The method of claim 1 wherein the addition of the chemical modifier reduces the amount of hydrogen chloride in the emitted fume stream by at least about 25% by weight.

12. The method of claim 1 wherein the addition of the chemical modifier reduces the amount of hydrogen chloride in the emitted fume stream by at least about 45% by weight.

13. The method of claim 12 wherein the chemical modifier is calcium hydroxide.

14. The method of claim 13 wherein the addition of the chemical modifier reduces the amount of hydrogen chloride in the emitted fume stream by at least about 65% by weight.

15. The method of claim 14 wherein the liquid seal comprises a mixture of process oil and water from the air-blowing process.

16. The method of claim 12 wherein the chemical modifier is added to the liquid seal at a level within the range of from about 0.01 kg to about 2 kg per every kilogram of active catalyst that is added to the asphalt.

17. The method of claim 16 wherein the chemical modifier is calcium hydroxide and wherein the addition of the calcium hydroxide reduces the amount of hydrogen chloride in the emitted fume stream by at least about 45% by weight.

18. The method of claim 1 wherein the liquid seal is within a knockout tank containing a process oil, and wherein the chemical modifier is added to the liquid seal at a level of at least about 0.0001 kg of chemical modifier per liter of the process oil.

19. The method of claim 1 comprising the additional step of passing the fume stream through a filter after passing the fume stream through the liquid seal and before emitting the fume stream.

20. The method of claim 19 wherein the filter is a fabric filter.

21. The method of claim 20 wherein the addition of the chemical modifier reduces the amount of hydrogen chloride in the emitted fume stream by at least about 25% by weight.

22. The method of claim 21 wherein the chemical modifier is calcium hydroxide and wherein the addition of the calcium hydroxide reduces the amount of hydrogen chloride in the emitted fume stream by at least about 25% by weight.

23. The method of claim 22 wherein the liquid seal is within a knockout tank containing a process oil, and wherein the chemical modifier is added to the liquid seal at a level of at least about 0.001 kg of chemical modifier per liter of the process oil.

24. The method of claim 1 comprising the additional step of injecting steam or water spray into the fume stream after the blowing step and before passing the fume stream through the liquid seal.

25. The method of claim 24 wherein the steam or water spray is injected at a rate within the range of from about 0.05 to about 6 liters of condensed water per minute per cubic meter of air flow at STP.

26. The method of claim 25 wherein the chemical modifier is calcium hydroxide and wherein the addition of the calcium hydroxide reduces the amount of hydrogen chloride in the emitted fume stream by at least about 25% by weight.

27. The method of claim 26 wherein the chemical modifier is added to the liquid seal at a level of at least about 0.001 kg of chemical modifier is added per liter of process oil.

28. A method for reducing hydrogen chloride emissions from an asphalt blowing process comprising:
    subjecting an asphalt to a blowing process using a catalyst selected from ferric chloride, ferrous chloride, or mixtures thereof, to produce a fume stream containing hydrogen chloride,
    passing the fume stream through a liquid seal including process oil, and
    emitting the fume stream,
    wherein a chemical modifier is added to the liquid seal prior to passing the fume stream through the liquid seal, and wherein the addition of the chemical modifier to the liquid seal reduces the amount of hydrogen chloride in the emitted fume stream compared to the same process without the addition of the chemical modifier, and wherein the chemical modifier is added to the liquid seal at a level of at least about 0.0001 kg of chemical modifier is added per liter of process oil.

29. The method of claim 28 wherein the chemical modifier is added to the liquid seal at a level of at least about 0.001 kg of chemical modifier is added per liter of process oil.

30. The method of claim 29 wherein the chemical modifier is selected from calcium oxide, calcium hydroxide, magnesium oxide, magnesium hydroxide, barium oxide, barium hydroxide, sodium oxide, sodium hydroxide, potassium oxide, potassium hydroxide, iron oxide, iron hydroxide, aluminum oxide, aluminum hydroxide, or combinations thereof.

31. The method of claim 30 wherein the chemical modifier is calcium hydroxide.

32. The method of claim 28 wherein the addition of the chemical modifier reduces the amount of hydrogen chloride in the emitted fume stream by at least about 10% by weight.

33. The method of claim 28 wherein the chemical modifier is calcium hydroxide and wherein the addition of the calcium hydroxide reduces the amount of hydrogen chloride in the emitted fume stream by at least about 25% by weight.

34. The method of claim 33 wherein the addition of the chemical modifier reduces the amount of hydrogen chloride in the emitted fume stream by at least about 65% by weight.

35. The method of claim 33 wherein the liquid seal comprises a mixture of process oil and water from the air-blowing process.

36. The method of claim 33 wherein the chemical modifier is added to the liquid seal at a level of at least about 0.001 kg of chemical modifier is added per liter of process oil.

37. The method of claim 28 comprising the additional step of passing the fume stream through a filter after passing the fume stream through the liquid seal and before emitting the fume stream.

38. The method of claim 37 wherein the filter is a fabric filter.

39. The method of claim 28 comprising the additional step of injecting steam or water spray into the fume stream after the blowing step and before passing the fume stream through the liquid seal.

40. The method of claim 39 wherein the steam or water spray is injected at a rate within the range of from about 0.05 to about 6 liters of condensed water per minute per cubic meter of air flow at STP.

41. The method of claim 40 wherein the chemical modifier is added to the liquid seal at a level of at least about 0.001 kg of chemical modifier is added per liter of process oil.

42. The method of claim 41 wherein the chemical modifier is calcium hydroxide and the addition of the chemical modifier reduces the amount of hydrogen chloride in the emitted fume stream by at least about 25% by weight.

* * * * *